April 2, 1940.  F. H. HEHEMANN  2,195,923
VALVE AND FLEXIBLE GATE
Filed Feb. 10, 1939  2 Sheets-Sheet 2
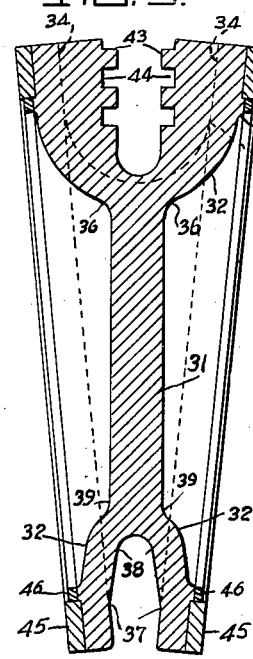
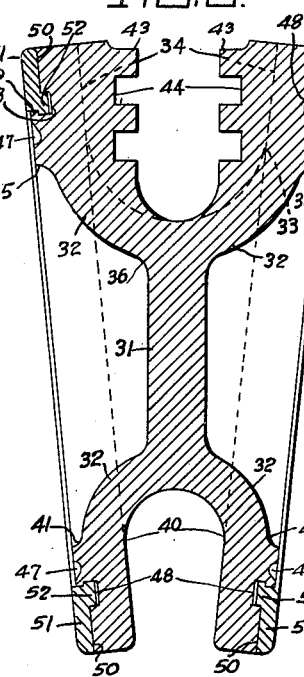
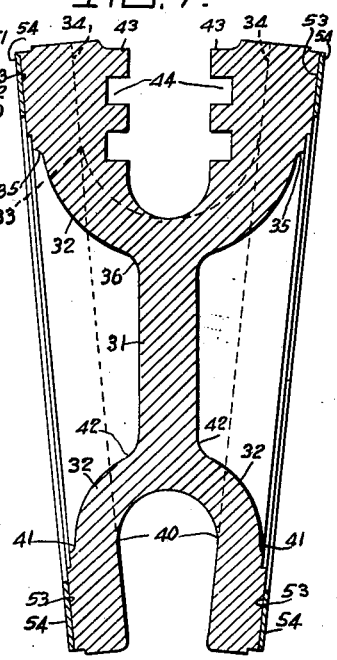
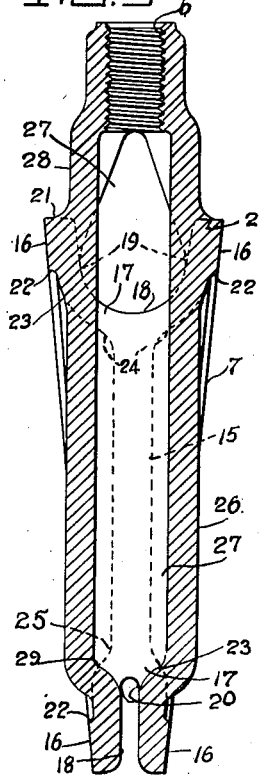
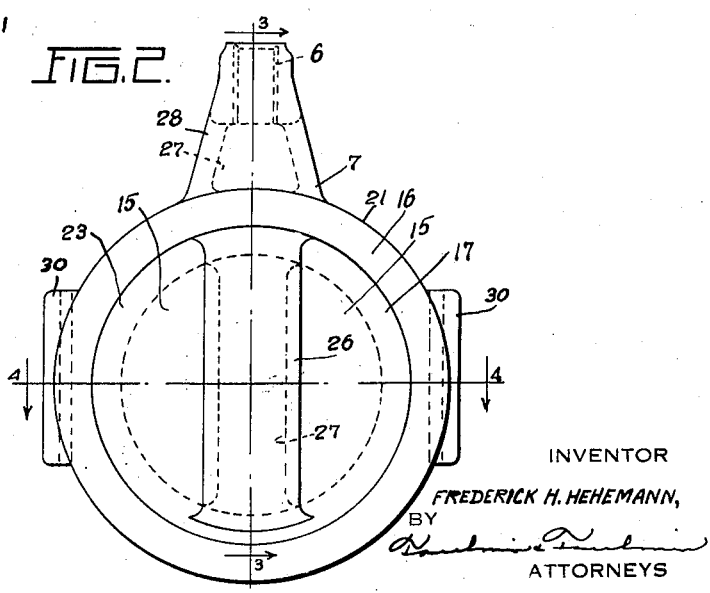
INVENTOR
FREDERICK H. HEHEMANN,
BY
ATTORNEYS Patented Apr. 2, 1940

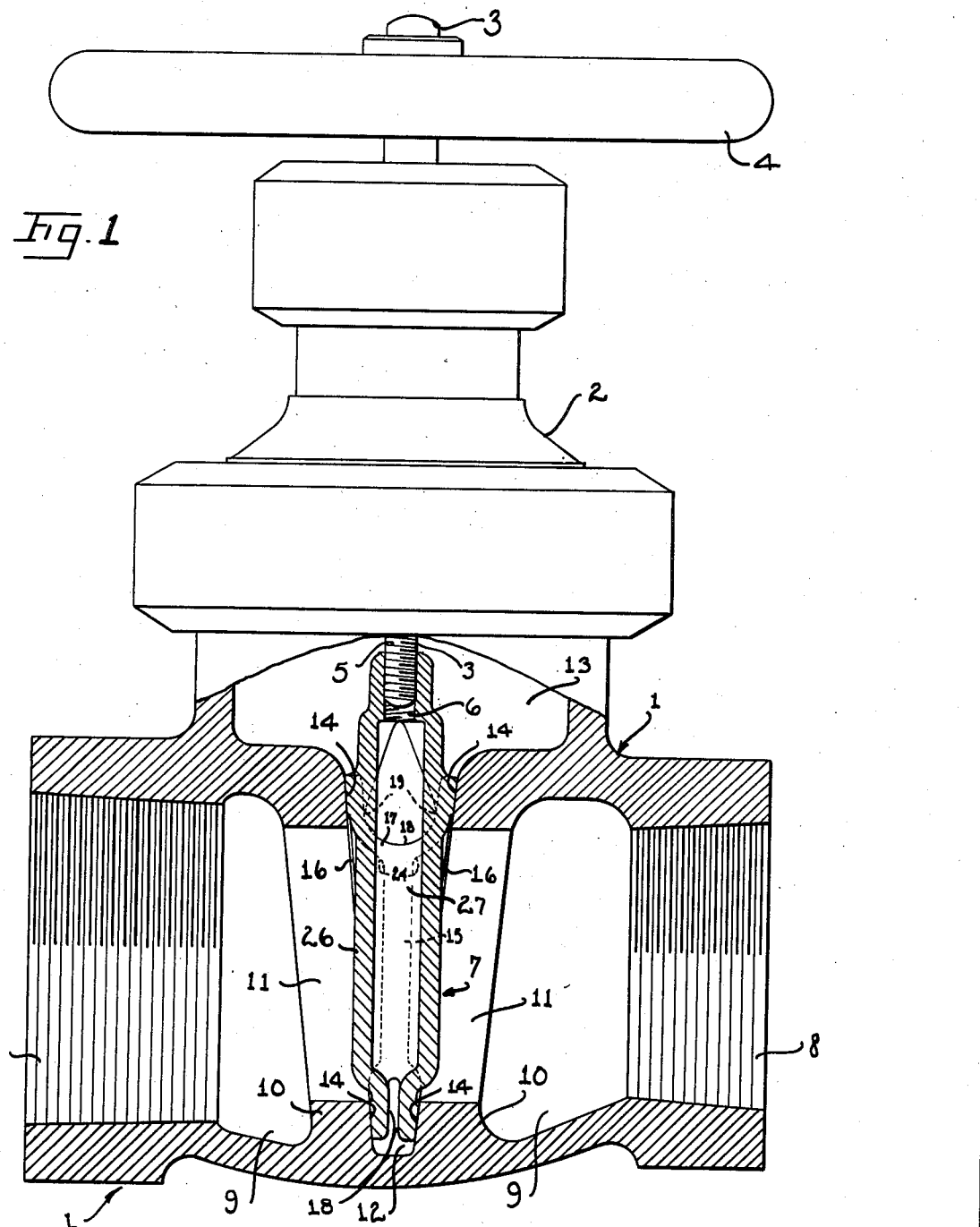

2,195,923

UNITED STATES PATENT OFFICE 2,195,923

VALVE AND FLEXIBLE GATE

Frederick H. Hehemann, Cincinnati, Ohio, assignor to The Lunkenheimer Company, Cincinnati, Ohio, a corporation of Ohio Application February 10, 1939, Serial No. 255,726

2 Claims. (Cl. 251—159)

This application is a continuation in part of my prior and co-pending application Serial No. 174,541, filed November 15, 1937, Patent 2,193,922, March 19, 1940, and relates to a valve and to a flexible valve gate therefor, which is adapted to yieldably engage with the seats in said valve whereby to more completely shut off flow through said valve.

The principal object of the invention is the provision of a resilient, flexible or yieldable valve gate for such a valve which is adapted to more completely close said valve under a wide range of service conditions.

It is a further object of the invention to provide a valve gate which is particularly adapted to compensate for elastic deformation of the valve body and its seats, incident to internal fluid pressure or to high temperatures.

It is a further object of the invention to provide a valve gate construction having sufficient resiliency to compensate for elastic and plastic or "creep" deformations of the valve body and its seats incident to high pressures or temperatures.

It is a further object of this invention to provide such a valve gate construction wherein the inherent resiliency of the valve gate will prevent "sticking" or "freezing" of the valve gate between the valve body seats, regardless of the effects of differential expansion or contraction of the several parts of the valve, during heating or cooling of the valve.

It is a further object of this invention to provide such a valve gate construction wherein the resiliency of the valve gate will compensate for and overcome the normal tendency of wear of the valve to cause the valve gate to seat improperly resulting in a valve which cannot completely close off the flow after it has been in use for a period of time.

These and other objects and advantages will appear from the following description taken in connection with the drawings.

In the drawings:

Figure 1 is an elevational view, with the valve gate and part of the valve body in section, of a non-rising-stem gate valve equipped with a valve gate constructed in accordance with the principles of this invention.

Figure 2 is a side elevational view of the valve gate of Figure 1 which is one form of valve gate constructed in accordance with the principles of this invention, and which is a one-piece integral valve gate.

Figure 3 is a section taken along the line 3—3 of Figure 2, looking in the direction of the arrows.

Figure 4 is a section taken along the line 4—4 of Figure 2, looking in the direction of the arrows.

Figure 5 is a section, similar to Figure 3, of a modified form of valve gate constructed in accordance with the principles of this invention, which has mechanically attached seat-engaging facing rings and is particularly adapted for use in a rising-stem gate valve.

Figure 6 is a section of a form of valve gate similar to that of Figure 5, but modified therefrom with respect to the method of attaching the seat-engaging facing rings.

Figure 7, likewise is a section of a form of valve gate similar to that of Figure 5, but modified therefrom with respect to the method of attaching the seat-engaging facing rings.

Referring now to the drawings and with reference particularly to Figure 1, the valve casing 1 has the bonnet 2 rigidly secured thereto in suitable manner, which bonnet rotatably supports the valve stem 3. The valve stem 3 is provided at its upper end with rigidly secured hand wheel 4 and, at its lower end with suitable screw threads 5 adapted to engage with screw threads 6 on the inside of the upper portion of the valve gate generally designated as 7.

The valve casing 1 is provided at opposite ends with suitable connector means 8 which may be in the form of internally formed screw threads for screw-threaded attachment of conduits thereto, or the ends of suitable conduits may be secured to the opposite ends of the valve casing by means of welding.

Adjacent each connector 8 is a chamber 9 which terminates at the opposite end in an inclined web 10 having a port 11 extending therethrough. The spaced webs 10 form an intermediate or central chamber 12, in which the valve gate 7 is movably supported. The side surfaces of valve gate 7 are inclined at approximately the same angle as the valve seats 14 formed on the inner sides of the web 10 adjacent and surrounding the ports 11 therein, and, when it is desired to open the valve, in order to provide communication between the chambers 9 therein, the hand wheel 4 is turned so as to rotate valve stem 3 which by its screw-threaded engagement with valve gate 7, causes valve gate 7 to be drawn upwardly into chamber 13 to provide communication through ports 11 between the chambers 9 of the valve and the pipes or conduits secured thereto.

The valve gate 7 of Figures 1 to 4 is an integral one-piece valve gate preferably comprising a casting of bronze or similar highly flexible metal which is adapted to yield and to "give" when it is pushed into engagement with the valve seats 14 so as to completely close off the flow when the valve is closed. Valve gate 7 is formed with a central, circular portion 15 which in conjunction with web 17 carrying seat-engaging faces 16 presents a complete barrier to fluid flow between chambers 9 when the valve is closed. Web 17 is annular, completely surrounding central portion 15. At the top of the valve gate, at the point adjacent connection of web 17 with central portion 15, inner face 18 of web 17 is in the form of a true circular arc, extending in this form between points 19 where it assumes a straight line tangent to said arc at points 19 and extending radially outwardly to the edge 21 of the valve gate. At the bottom of the valve gate at the point adjacent connection of web 17 with central portion 15, the face 18 of web 17 is in the form of a true circular arc of considerably smaller radius than the arc at the top. The face 18 of the web extends in the form of this circular arc between points 20 where the face assumes a straight line tangent to said arc at points 20 and extending radially outwardly to the outer edge 21 of web 17. Points 19 of tangency are located not substantially radially outwardly of inner edges 22 of the seat-engaging valve faces 16, and points 20 of tangency are located well radially inwardly of the inner edges 22 of faces 16.

The outer face 23 of web 17 is in a form following approximately the contour of its inner face 18. Thus at the top, face 23 is in the form of an arc of a circle between approximately point 22 and approximately point 24 where web 17 joins with central portion 15. At the bottom, face 23 is in the form of a roughly circular arc from approximately point 22 to point 25 where intersection with the outer face of central portion 15 occurs.

As a result of this construction web 17 is of substantially constant thickness throughout and its outer portions opposite seat-engaging faces 16 are substantially straight for a distance radially inward to a point where the web 17 assumes the form of a circular arc at the top and bottom of the valve gate. Between the top and bottom the inner and outer faces of web 17 assume a parabolic form as is indicated in Figure 4 wherein both the inner face 18 and outer face 23 follow a parabolic contour, for their portion corresponding to the true circular portion at the top.

Formed in the central portion 15 of valve gate 7 is an annular boss 26 which provides a space 27 adapted to receive valve stem 3 as the valve is opened. This annular boss is extended upwardly of the valve gate proper in the form of annular extension 28, which at its extreme upper portion is provided with internal threads 6 which receive the threaded lower portion of valve stem 3. As shown in Figure 3, space 27 for receiving valve stem 3 extends from the threads 6 down to point 29 where web 17 is met at the bottom of the valve gate 7. At point 29 the annular boss 26 is constructed so as to recede entirely before the beginning of faces 16 at the bottom of the valve gate.

Guide flanges 30 are provided at each side of valve gate 7, as indicated in Figures 2 and 4. These flanges 30 form a guide channel therebetween which is adapted to slidably engage cooperating guide ribs formed in the sides of the central chamber 12 of the valve casing 1 in order to provide vertical guiding means for the valve gate. These guide flanges and ribs engage loosely so as to not interfere with the flexible seating of valve gate seat faces 16 with seats 14, which is brought about by the web construction described above.

The valve gates illustrated in Figures 5 to 8 are similar in general features of construction to the valve gate of Figures 1 to 4. Thus they have a solid central portion 31, and the circular seat facings are carried in an inclined position by web 32 extending annularly of and integral with central portion 31. At the top of the valve gate the inner face 34 of 32 extends inwardly in a straight line parallel to the seat facings until a point 33 is reached which is located radially inwardly of the inward edge of the seat facing. The inner face 34 then assumes the form of a true circular arc between points 33. On the outer side of web 32, at approximately point 35 which is located at the inward edge of the seat facing, this outer side assumes the form of a circular arc and continues in this form until it intersects the outer face of central portion 31 at point 36.

Similarly at the bottom of the valve gate illustrated in Figures 5 to 8, web 32 extends inwardly in a straight line on its inner face until a point not substantially radially outwardly of the inner edge of the facing rings is reached.

In Figure 5, the inner face of web 32 follows a straight line until point 37 is reached and then follows a straight line to point 38 where it assumes a circular arc which extends between points 38, and the outer face of web 32 is roughly parallel to the inner face until it reaches point 39 where it merges with the outer face of central portion 31. In Figures 6 and 7 the inner face of web 32 follows a straight line until point 40 is reached which is inwardly of the inner edge of the valve seat facings, and then follows a true circular arc between points 40. In Figures 6 and 7, the outer face of web 32 is parallel with the seat facings until approximately point 41 is reached where it assumes the form of a true circular arc concentric with the circular arc on the inner face, following the form of this circular arc until approximately point 42 is reached where it intersects the outer face of central portion 31.

As in the valve gate of Figures 1 to 4, in the valve gates of Figures 5 to 7 web portion 32 assumes a parabolic form at points intermediate its top and bottom portion by reason of the incline of the extending projections of the web 32 relative to one another.

The valve gates of Figures 5 to 7 are therefore like the valve gates of Figures 1 to 4 in that they embody a central portion supporting a web which carries on its outer faces the valve seat engaging faces and which has a portion joining the seat engaging faces to the central portion which portion is of circular cross-section at the top and bottom points of the valve gate and is of parabolic cross-section at all other points.

The valve gates of Figures 5 to 7 differ from that of Figures 1 to 4 in that they do not have a valve stem receiving space cast in their central portion because these valve gates are to be used in a rising-stem type of valve. They are provided with inwardly extending projections 43 and laterally extending parallel channels 44 which form ribs and channels adapted to slidably and laterally engage cooperating ribs and channels formed on the lower portion of a valve stem whereby when the valve stem is raised or lowered the valve gate will be moved therewith so as to open or close the valve.

In Figure 5 the valve seat engaging faces 45 are formed of nickel alloys, stainless steel, stellite or other suitable materials which have the desired hardness, wear resistance and corrosion resistance and the body of the valve gate is integral and made of bronze, cast iron, steel or other suitably tough and flexible material. Facings 45 are secured rigidly and/or integrally to the web 32 by means of welding 46 at their inward edge, a rolled-in construction commonly used in commercial practice.

In Figure 6 I have illustrated a method for mechanically securing facing rings 51 of nickel bronze, nitralloy, stainless steel or the like to the web 32. As shown in this figure, the web portions of the valve gate body are provided with a groove 47, a deeper groove 48, grooves 47 and 48 forming a tongue 49 therebetween, and with a stepped portion 50. The facing ring is designated as 51 and is substantially annular and provided with a stepped inwardly extending annular projection or tongue 52. The facing rings 51 are pressed on the valve gate body with tongue 52 disposed in groove 48 and thereafter tongue 49 is rolled over against the inward edge of facing ring 52 which rigidly secures the facing rings 52 and produces a pressure tight joint.

In Figure 7 the valve gate body is machined on the outer portions 53 of its webs 32 so as to be of less thickness than required for the ultimate valve gate, whereupon a stellite facing ring 54 is deposited on 53 from stellite rods by means of a suitable gas welding torch. The stellite faces are then suitably finished to a thickness of between 1/11" to 3/32".

It will be understood that the above described structure is merely illustrative of the manner in which the principles of my invention may be utilized and that I desire to comprehend within my invention such modifications as come within the scope of the claims and the invention.

Having fully described my invention what I claim is:

1. A valve gate comprising an integral body member with a web portion having radially disposed flanges at opposite sides, annular peripheral groove means in each flange, a facing ring of stainless iron having an undercut projection extending into a portion of the groove means in each flange, and a rolled over portion on each of said flanges engaging the undercut surface of the projection on said facing ring.

2. A valve gate comprising an integral body member with a web portion having radially disposed flanges at opposite sides, annular peripheral groove means in each flange, a seat-engaging facing ring having an undercut projection extending into a portion of the groove means in each flange, and a rolled over portion on each of said flanges engaging the undercut surface of the projection on said facing ring.

FREDERICK H. HEHEMANN.